United States Patent [19]
Ueda

[11] Patent Number: 5,655,048
[45] Date of Patent: Aug. 5, 1997

[54] IMAGE REPRODUCING APPARATUS CAPABLE OF ELIMINATING VERTICAL WOBBLES

[75] Inventor: Takeshi Ueda, Nagaokakyo, Japan

[73] Assignee: Mitsubishi Denki Kabushiki Kaisha, Tokyo, Japan

[21] Appl. No.: 668,261

[22] Filed: Jun. 20, 1996

[30] Foreign Application Priority Data

Jun. 20, 1995 [JP] Japan .................................. 7-153688

[51] Int. Cl.$^6$ .............................. H04N 5/76; H04N 5/92
[52] U.S. Cl. ........................... 386/84; 386/85; 360/63; 360/64
[58] Field of Search .......................... 386/12, 13, 18, 386/20, 48, 71, 84, 85, 89, 90; 360/27, 61, 63, 64; H04N 9/80, 9/89, 5/94, 5/91, 5/932, 5/935, 5/95, 5/92, 5/76

[56] References Cited

U.S. PATENT DOCUMENTS

| | | | |
|---|---|---|---|
| 4,858,030 | 8/1989 | Oku et al. | 386/71 |
| 5,179,477 | 1/1993 | Kokama | 386/84 |
| 5,191,434 | 3/1993 | Kim | 386/84 |
| 5,461,487 | 10/1995 | Asakura | 386/84 |

FOREIGN PATENT DOCUMENTS

| | | |
|---|---|---|
| 527309 | 5/1983 | Japan . |
| 543234 | 9/1986 | Japan . |
| 514731 | 9/1988 | Japan . |
| 6197300 | 7/1994 | Japan . |

Primary Examiner—Thai Tran

[57] ABSTRACT

A first head changeover signal generation circuit generates a first head changeover signal to be used for switching between first heads and between second heads. A second head changeover signal generation circuit generates a second head changeover signal to be used for switching between the pair of first heads and the pair of second heads. A head amplifier selects one of FM field signals reproduced by the first and second heads in accordance with the first and second head changeover signals, and a FM detection circuit converts the selected FM signal into a video signal. A pseudo vertical sync signal generation circuit generates a pseudo vertical sync signal in accordance with the first and second head changeover signals. A switch selects, in accordance with the second head changeover signal, one of the as-produced pseudo vertical sync signal and a delayed pseudo vertical sync signal delayed by a variable delay circuit. The selected pseudo vertical sync signal is added to the video signal. A FM signal recorded on the same recording track is reproduced, for instance, three times by the first head and the second head by one field for each head.

8 Claims, 11 Drawing Sheets

IMAGE REPRODUCING APPARATUS CAPABLE OF ELIMINATING VERTICAL WOBBLES

BACKGROUND OF THE INVENTION

1. Field of the Invention

This invention relates to a magnetic image recording and reproducing apparatus (what is called a time-lapse VTR) capable of reproducing images that are free of vertical wobbles even in continuous playback of a tape that was subjected to long-term recording with omission of fields.

2. Description of the Related Art

Japanese Unexamined Patent Publication No. Hei. 6-197300 discloses an example of a time-lapse VTR in which a video signal is recorded with such omission of fields that only one field is recorded every three fields and playback is performed continuously. This publication relates to a gate means and a tape running control means for omitting fields. A conventional VTR will be described below which reduces the degree of vertical wobbles by employing the scheme of this publication.

FIG. 11 is a block diagram showing the configuration of an image signal processing apparatus for use in a conventional monitoring VTR, and FIG. 10 is a schematic diagram showing the arrangement of four heads on a rotary drum.

In FIG. 10, reference numeral 1 designates a rotary drum. Numerals 2a and 2b denote a pair of first heads which have different azimuth angles and are spaced apart from each other by 180°. Numerals 3a and 3b denote a pair of second heads which have the same azimuth angles as the heads 2a and 2b, respectively, and are positioned ahead of the heads 2a and 2b by a distance corresponding to an integral multiple (in this embodiment, 2H) of one horizontal scanning period (hereinafter referred to as 1H) on a video track to be recorded on a magnetic tape by means of the first heads 2a and 2b.

Conventionally, monitoring of 18 hours with a VTR is performed in the following manner, for example., That is, with the use of a tape having a recording time of 120 minutes, a recording mode of the VTR is selected which has a recording time three times that of a six-hour recording mode (triple recording mode; hereinafter referred to as an EP mode). The six-hour recording mode is a recording mode in which the recording time is tripled from 2 hours of a standard recording mode (hereinafter referred to as an SP mode) having a VHS video standard tape feed rate by making both of the tape feed rate and the recording track width ⅓ of those of the SP mode.

To carry out 18-hour recording, only the tape feed rate is set at ⅓ of that of the EP mode and a tape is continuously run. A video signal is recorded on the tape once every three fields of the video signal by means of the pair of second heads 3a and 3b provided on the rotary drum 1. During playback of the video signal, while the tape is continuously fed at the same tape feed rate as that of the recording, that is, at a rate ⅓ that of the EP mode, the same record track is repeatedly reproduced by alternately using the heads that have the same azimuth angle and are spaced apart from each other by about 180° (i.e., approximately opposed to each other) on the rotating drum 1.

At this time, to reproduce the same track three times, playback is performed such that the head 3a is used first, the head 2a having the same azimuth as the head 3a is then used, and the head 3a is thereafter used again. Since the head 2a is positioned behind the head 3b by a distance corresponding to a gap space in the drum rotational direction, a video signal reproduced by the head 2a lags from a video signal reproduced by the head 3a by a time corresponding to the gap space, for instance, 2H (see FIG. 12(c)). Unless this time lag is eliminated, images reproduced on a monitor will have vertical wobbles due to the 2H time lag of a V-sync signal (vertical synchronizing signal) corresponding to the gap space. To avoid this problem, a FM-demodulated image signal (video signal) obtained from a FM reproduction signal reproduced by the second head 3a is delayed by 2H with two cascade 1H delay circuits 7 and 8 (see FIG. 10). This is shown in FIG. 12(d).

Similarly, the same track is reproduced repeatedly such that the head 3b is used first, the head 2b having the same azimuth as the head 3b is then used, and the head 3b is thereafter used again. An image signal obtained with the use of the second head 3b is delayed by 2H. This is shown in FIG. 12(g).

The operation of each block shown in FIG. 11 will be described below. FM signals recorded field by field on a magnetic tape are reproduced by the pair of first heads 2a and 2b and the pair of second heads 3a and 3b. Selection between reproduced first field signals 21 and 24 and reproduced second field signals 23 and 22 is made in a head amplifier 4 based on a first head changeover signal having a 50% duty ratio that is produced by a first head changeover signal generation circuit 9. On the other hand, selection between outputs of the pair of first heads 2a and 2b and outputs of the pair of second heads 3a and 3b is made based on a second head changeover signal 26 that is produced by a second head changeover signal generation circuit 10. A selected reproduction signal is amplified by a head amplifier 4.

The selected and amplified FM reproduction signal is detected by an FM detection circuit 5, whereby a video signal 27 is obtained. This video signal 27 is delayed by two 1H-delay circuits 7 and 8 (for example, 1H CCD), to become a video signal 28 delayed by 2H. Both of the video signal 27 and the delayed video signal 28 are input to a switch 6. The switch 6 outputs either of the two received video signals on the basis of the second head changeover signal 26. Specifically, the switch 6 outputs the video signal 27 while the first head 2a or 2b is doing reproduction, and outputs the video signal 28 while the second head 2a or 2b is doing reproduction.

Referring to FIGS. 12 and 13, an explanation will be given of a case of reproducing FM signals that were alternately recorded at different azimuth angles on a magnetic tape by means of the pair of first heads 2a and 2b and the other pair of second heads 3a and 3b by continuously running the tape at a tape feed rate that is ⅓ of the tape feed rate of the EP mode.

FIG. 13 shows recorded recording tracks A and B on which FM signals are recorded by heads having different recording azimuth angles. Since FM signals are recorded once every three fields as mentioned above, they are recorded in the recording tracks A and B on the magnetic tape as shown in FIG. 13. At the time of playback, the FM signals are reproduced by tracing each of the tracks A and B three times.

The recording tracks A and B having different azimuth angles are traced as shown in FIG. 13. Specifically, the recording track A is traced by the heads 3a, 2a, and 3a in this order, and the recording track B is traced by the heads 3b, 2b, and 3b in this order. That is, the heads 2a and 2b trace the center line of each recording track, and the heads 3a and 3b trace both sides of the center line of each recording track. This reproducing operation can be controlled by a phase relationship between recording tracks and a control track signal (which is usually recorded at the lower end of the tape) which acts as a reference signal instead of V-sync signals of a recording signal.

As seen from FIG. 12, reproduction video signals 27 obtained from the FM signals of the recording tracks A and B are sequentially output from the FM detection circuit 5, and delayed by the 1H-delay circuits 7 and 8, to become delayed reproduction video signals 28. Both of the video signals 27 and 28 are input to the switch 6, where the delayed reproduction video signals of the heads $3a$ and $3b$ (see FIGS. 12(d) and 12(g)) are selected based on the second head changeover signal 26.

When the recording tracks A and B are traced by the heads as shown in FIG. 13, the head $2a$ reproduction video signal and the head $3a$ delayed playback video signal are output from the switch 6 in connection with the recording track A, whereas the head $2b$ reproduction video signal and the head $3b$ delayed reproduction video signal are output from the switch 6 in connection with the recording track B. That is, the video signals are output in the order of the head $3a$ delayed reproduction video signal, the head $2a$ reproduction video signal, the head $3a$ delayed reproduction video signal, the head $3b$ delayed reproduction video signal, the head $2b$ reproduction video signal, the head $3b$ delayed reproduction video signal Although the above description is directed to the case where the first heads $2a$ and $2b$ trace the center lines of respective recording tracks at the time of playback, the first heads $2a$ and $2b$ and the second heads $3a$ and $3b$ may be interchanged so that the centers of respective recording tracks are traced by the second heads $3a$ and $3b$.

Since the conventional image recording and reproducing apparatus also capable of long-term recording is constructed as described above, it necessarily requires the 1H-delay circuits 7 and 8 and the switch 6. If the delay circuits 7 and 8 are implemented by a CCD (charge-coupled device), it will cause a cost increase. On the other hand, other types of delay elements have a problem of low accuracy of a delay time. Moreover, it is difficult to freely set a delay time in accordance with the gap spaces between the first heads $2a$ and $2b$ and the second heads $3a$ and $3b$.

The conventional image recording and reproducing apparatus also capable of long-term recording copes with only vertical wobbles caused by the gap spaces of the magnetic heads. However, the conventional image recording and reproducing apparatus cannot completely eliminate, for instance, vertical wobbling of images due to so-called horizontal deviation which wobbling arises in reproducing the same track two or more times while a recorded tape in which positions of H-sync signals (horizontal synchronizing signals) of adjacent tracks recorded at the lower end of the magnetic are deviated from each other is continuously run at a given speed.

Furthermore, the conventional image recording and reproducing apparatus also capable of long-term recording cannot completely eliminate vertical wobbling of reproduced images on a monitor caused by a phenomenon that the delay time to be corrected depends on the linearity of a vertical scanning circuit of each monitor.

SUMMARY OF THE INVENTION

The present invention has been conceived to resolve the above mentioned problems, and an object of this invention is to eliminate vertical wobbling of images due to the gap spaces of magnetic heads, as well as vertical wobbling due to horizontal deviations between H-sync signals of adjacent tracks recorded at the lower end of a tape which has not been eliminated completely in the art.

Another object of the present invention is to eliminate vertical wobbling of images that depends on each monitor. In other words, it is intended to allow the delay time to be so adjusted as to be optimum for the characteristic of each monitor even if a user uses various monitors, to thereby completely eliminate vertical wobbling of images for each monitor.

According to the invention, there is provided an image reproducing apparatus comprising:

a pair of first heads opposed to each other on a head drum;

a pair of second heads opposed to each other on the head drum, and spaced from the respective first heads by a distance corresponding to a horizontal scanning period multiplied by a given integer;

first head changeover signal generating means for generating a first head changeover signal to be used for switching between the first heads and between the second heads;

second head changeover signal generating means for generating a second head changeover signal to be used for switching between the pair of first heads and the pair of second heads;

reproduction signal processing means for selecting one of FM signals reproduced by the first and second heads in accordance with the first and second head changeover signals, and for converting the selected FM signal into a video signal;

pseudo vertical sync signal generating means for generating a pseudo vertical sync signal in accordance with the first and second head changeover signals;

pseudo vertical sync signal adding means for adding the pseudo vertical sync signal to the video signal produced by the reproduction signal processing means;

recording medium feeding means for feeding a recording medium so that a FM signal recorded on a portion of the recording medium corresponding to a width of a recording track of a normal-speed recording, double-speed recording, or triple-speed recording is reproduced by the first and second heads by at least one field for each head; and delay means for changing timing of the pseudo vertical sync signal with respect to the first head changeover signal in accordance with the second head changeover signal.

The above configuration eliminates vertical wobbles of images due to positional deviations of H-sync signals at the bottom end of a tape, thereby enabling reproduction of high-quality images.

The delay means may switch between first timing of the pseudo vertical sync signal for the video signal produced by use of the first heads and second timing of the pseudo vertical sync signal for the video signal produced by use of the second heads.

In the delay means, a difference between the first timing and the second timing may be set at a time necessary for the head drum to rotate over the distance between the first heads and the second heads.

The first and second head changeover signal generating means may generate the first and second head changeover signals to be used for switching between the first and second heads so that the first or second heads reproduce FM signals that are recorded so that horizontal sync signals of adjacent recording tracks are deviated from each other by NH at a bottom end of the recording medium, where H is the horizontal scanning period; the recording medium feeding means may feed the recording medium at so low a speed that the portion of the recording medium corresponding to the width of the recording track of the normal-speed recording, the double-speed recording, or the triple-speed recording is reproduced by at least one field by each head and is-reproduced by L fields by the first head and the second head; and the pseudo vertical signal generating means may generate pseudo vertical signals that are deviated from each other at intervals of NH/L.

The image reproducing apparatus may further comprise adjusting means for changing the difference between the first timing and the second timing. This configuration can eliminate vertical wobbles of images which occur depending on the monitor.

The recording medium feeding means may feed and stop the recording medium so that a FM signal recorded on the same recording track is reproduced by the first head and the second head by at least one field; the delay means may change timing at which the pseudo vertical sync signal is added to a video signal being reproduced while the recording medium is stopped by the recording medium feeding means; and the image reproducing apparatus may further comprise adjusting means for adjusting the difference between the first timing and the second timing. This configuration can eliminate wobbles of still images, thereby enabling reproduction of clear still images.

The adjusting means may be so constructed as to be able to adjust the difference between the first timing and the second timing while FM signals are reproduced from the recording medium while the recording medium is fed, as well as while it is stopped. This configuration enables adjustments to wobbles of both moving images and still images.

DESCRIPTION OF THE PREFERRED EMBODIMENTS

First Embodiment

Figure 1:
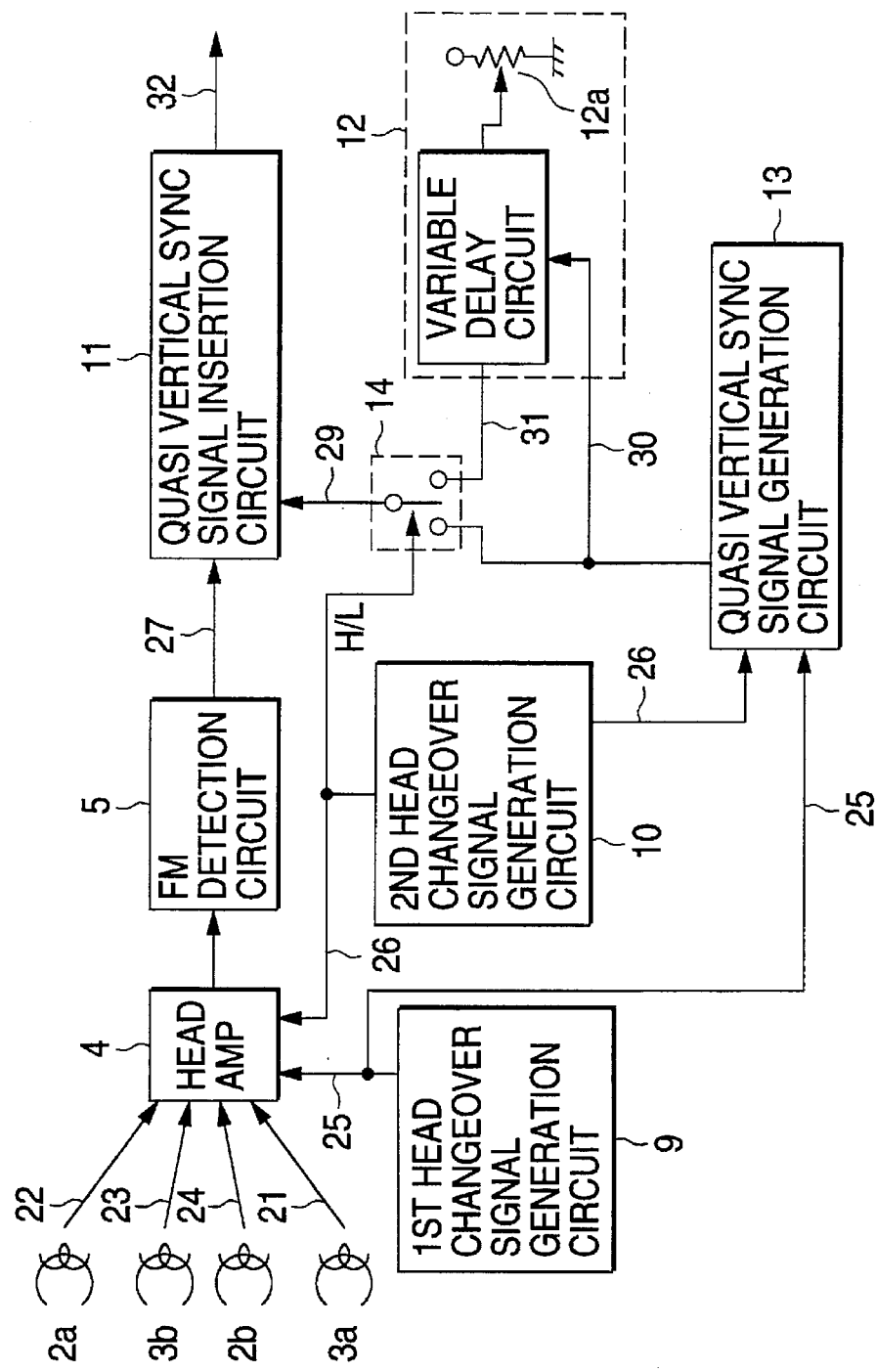
FIG. 1 is a block diagram showing the configuration of a video signal processing circuit of a VTR according to an embodiment of the present invention.
Figure 11:
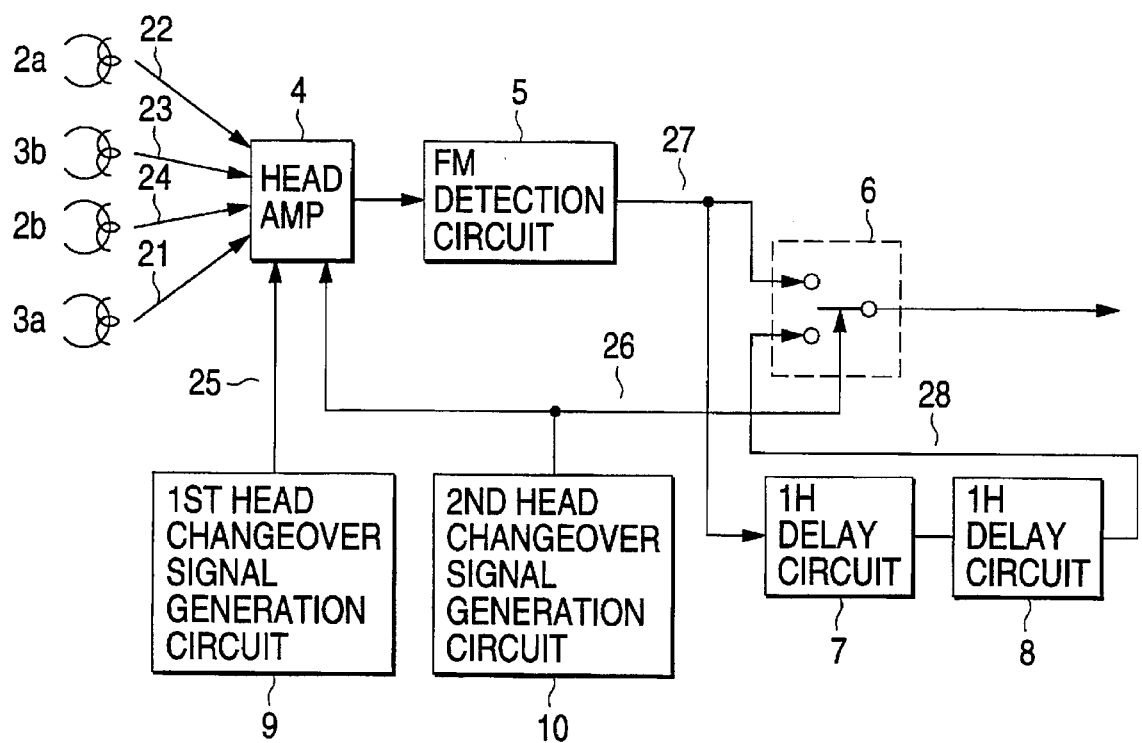
FIG. 11 is a block diagram showing the configuration of a video signal processing circuit of a conventional VTR.
Figure 12:
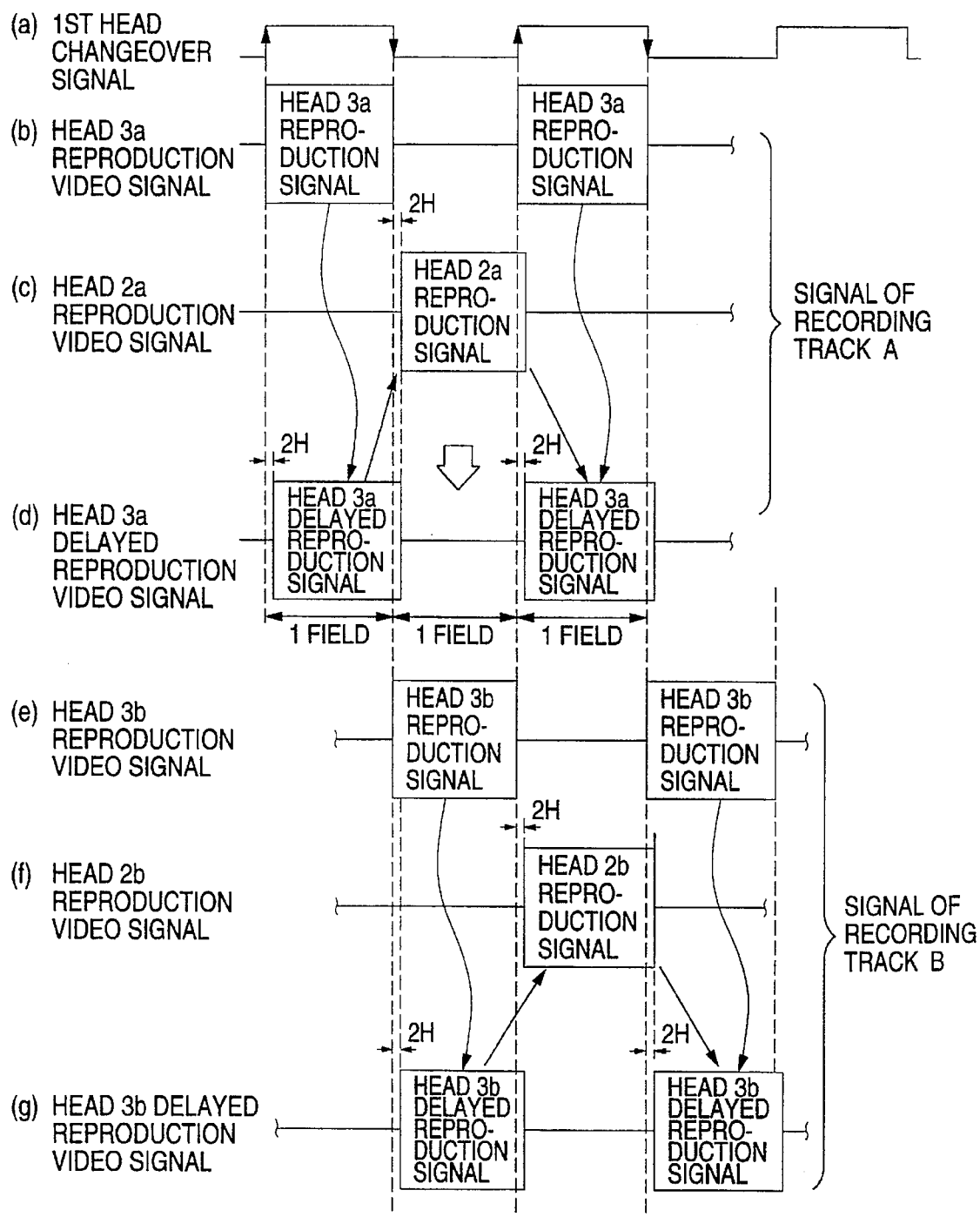
FIG. 12 is a timing chart showing delay of reproduction video signals associated with heads 2a and 2b which delay is introduced to compensate for a gap space.
Figure 13:
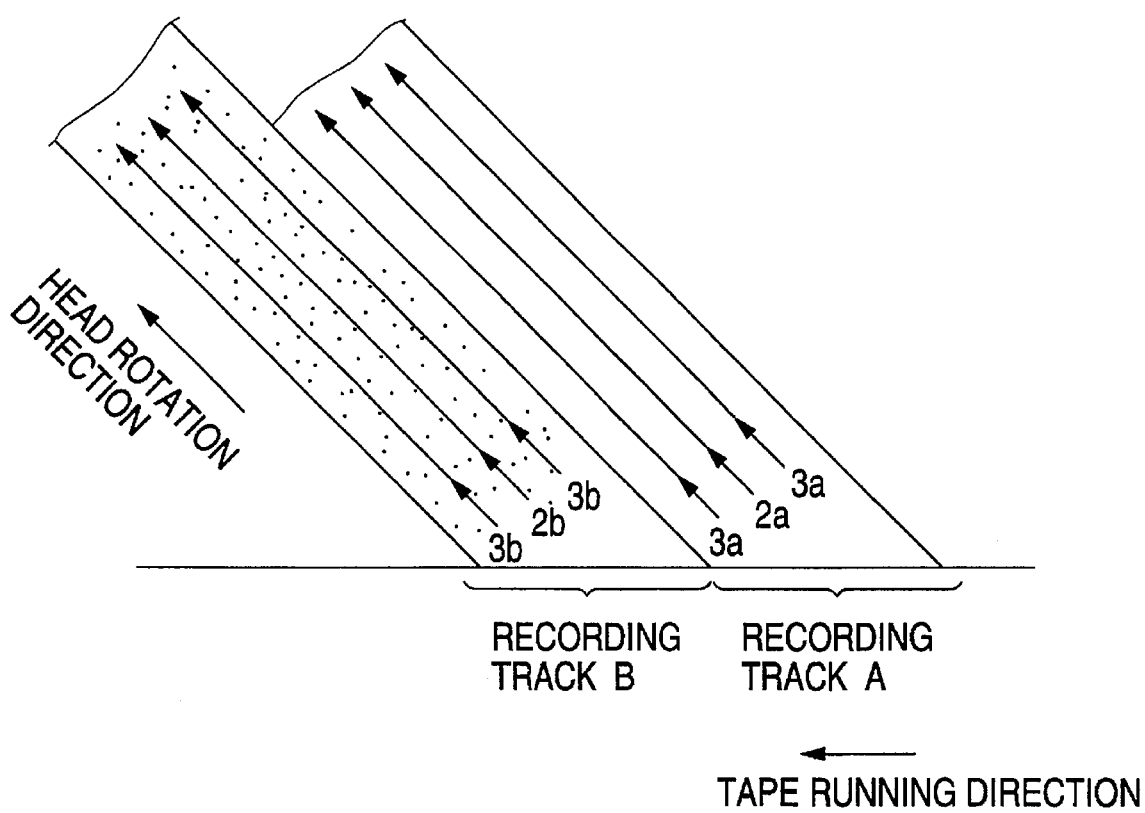
FIG. 13 illustrates how recording tracks are traced by the respective heads.

One embodiment of the present invention will be described hereinbelow. FIG. 1 is a block diagram showing the configuration of a video signal processing circuit for use in a VTR according to this embodiment. The same reference numerals are provided to designate the corresponding components of the conventional image reproducing apparatus shown in FIG. 11, and detailed descriptions thereof will be omitted here for brevity.

In FIG. 1, a pseudo vertical sync signal generation circuit 13 generates a pseudo vertical sync signal 30 whose fall timing is changed based on a first head changeover signal 25 supplied from a first head changeover signal generation circuit 9 and a second head changeover signal 26 supplied from a second head changeover signal generation circuit 10. A variable delay circuit 12 delays the pseudo vertical sync signal while varying the delay time with a variable volume 12a. A switch 14 selects the pseudo vertical sync signal 30 or a delayed pseudo vertical sync signal 31 based on a second head changeover signal 26. A pseudo vertical sync signal insertion circuit 11 outputs a video signal 32 produced by adding an output 29 of the switch 14 to a video signal 27.

Figure 2:
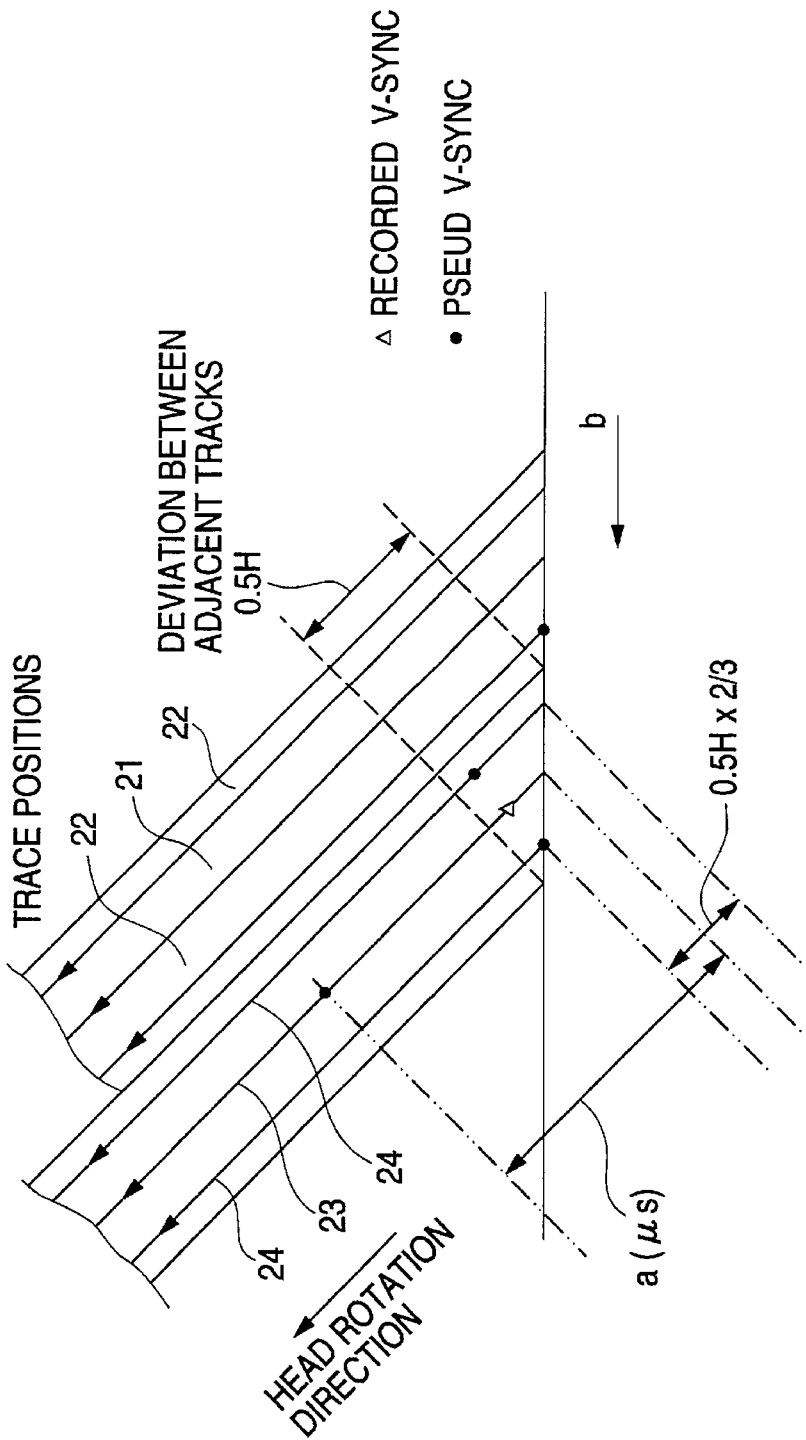
FIG. 2 illustrates how recording tracks are traced by respective heads in the invention.

FIG. 2 shows loci of scanning of heads along video tracks recorded on a magnetic tape. These loci of scanning are obtained when a tape, on which video signals are recorded once every three fields by means of second heads 3a and 3b at a tape feed rate of ⅓ of that of the EP mode, is subjected to continuous playback in which the tape feed rate is the same as in the recording and the tracking is properly adjusted. In FIG. 2, reference numerals 21, 22, 23, and 24 denote field signals, which are to be reproduced by heads 2a, 3a, 2b, and 3b, respectively. In FIG. 2, mark A designates a recorded V-sync signal, and mark ● designates a pseudo V-sync signal (pseudo vertical sync signal).

A magnetic tape travels in a direction designated by arrow b. Although there is a shift of 0.5H between adjacent tracks at the lower end of the tape, magnetic patterns corresponding to horizontal sync signals recorded on both tracks are aligned with each other: H-alignment is attained.

If no pseudo vertical sync signals were added to reproduction video signals, reproduced vertical sync signals and image signals corresponding to the field signals 24, 23, and 24 would be deviated from each other by ⅓ of 0.5H. Further, the field signal 23 associated with the first head (head 2b) would be reproduced with a delay of 2H corresponding to the gap space of the magnetic heads from the field signal 24 that is associated with the second head (head 3b). (In this embodiment, the time lag is not necessarily an integral multiple of 1H but may be a number including a decimal such as 1.5H). For this reason, the frequency of vertical sync signals would become indeterminate cyclically, so that a vertical wobble would occur at such a level that the frequency goes out of a lead-in range of a vertical scanning device of a monitor.

Figure 3:
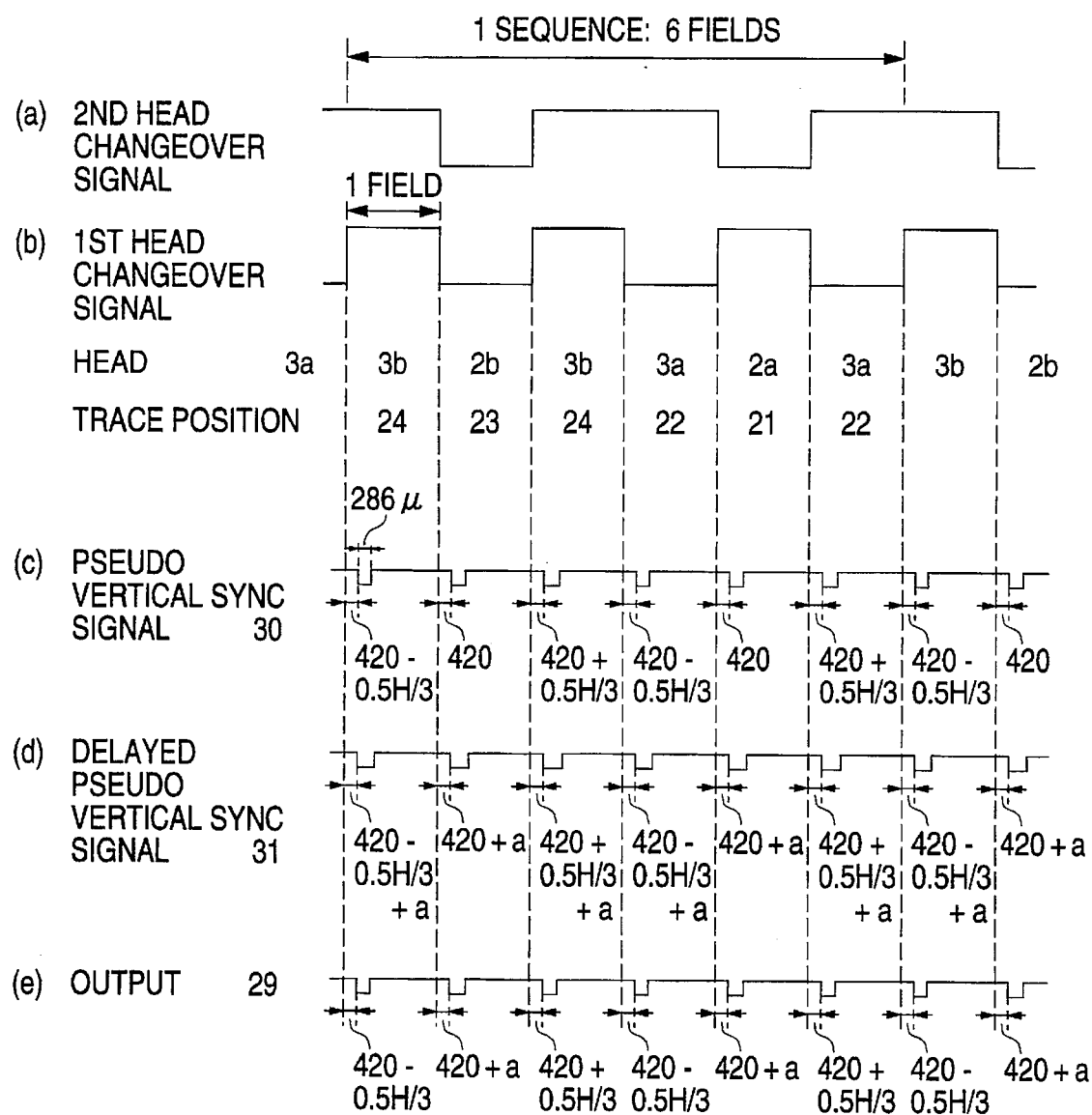
FIG. 3 is a timing chart showing a relationship between a pseudo vertical sync signal and first and second head changeover signals in the invention.

The operation of the image reproducing apparatus with the above configuration will now be described. FIG. 3 shows waveforms of pseudo vertical sync signals 30 that are output in accordance with the H and L levels of the first head changeover signal 25 and the second head changeover signal 26.

In first reproduction of the signal 24 by the head 3b, a pseudo vertical sync signal 30 with a delay of 420−0.5H/3 µs is produced by the pseudo vertical sync signal generation circuit 13 as shown in FIG. 3 (see FIG. 3(c)), and input to the switch 14 as well as to the variable relay circuit 12.

While reproduction is performed by the head 3b, the second head changeover signal 26 at an H level is input to the switch 14, whereby the pseudo vertical sync signal 30 is selected from the two signals being input to the switch 14. The selected pseudo vertical sync signal 30 is supplied to the pseudo vertical sync signal insertion circuit 11 as the output signal 29 (see FIG. 3(e)). The pseudo Vertical synchronization signal insertion circuit 11 adds the signal 29 to the video signal 27, and outputs a resulting signal as a video signal 32.

As for the delay time mentioned above, 420−0.5H/3 µs is calculated as 409 µs, where 420 µs is timing to add a reference pseudo vertical sync signal with respect to the rising edge of the first head changeover signal 25 and 1H=63.5 µs.

When reproduction is performed by the head 2b, a pseudo vertical sync signal 30 with a delay of 420 µs produced by the pseudo vertical sync signal generation circuit 13 is input to the variable delay circuit 12 and the switch 14. Since the second head changeover signal 26 at a L level is input to the switch 14, a delayed pseudo vertical sync signal 31 with a delay of 420+a µs is selected from the two signals being input to the switch 14 and supplied to the pseudo vertical sync signal insertion circuit 11 as the output signal 29 (see FIG. 3(e)). The pseudo vertical sync signal insertion circuit 11 adds the signal 29 to the video signal 27, and outputs a resulting signal as the video signal 32.

The variable delay circuit 12 delays the received pseudo vertical sync signal 30 by a period a, and outputs the delayed pseudo vertical sync signal 31 having a delay of 420+a µs. Here, the period a is a reference delay time which is set with respect to the second head changeover signal 25 so as to minimize vertical wobbles.

For example, the pseudo vertical synchronization signal 30 received by the variable delay circuit 12 is delayed by 50 µs (=a), and supplied to the switch 14 as the delayed pseudo vertical sync signal 31 (see FIG. 3(d)).

The 50-µs delay is to allow a TV set to absorb vertical jitter of a video signal by establishing vertical synchronization. Therefore, the pseudo vertical sync signal associated with the head 2a or 2b lags from that associated with the head 3a or 3b by a period shorter than 2H (63.5×2 µs).

Further, when second reproduction is performed by the head 3b, the switch 14 receives the second head changeover signal 26 at an H level. Accordingly, the switch 14 selects a pseudo vertical sync signal 30 with a delay of 420+0.5H/3 µs (see FIG. 3(d)), which is output as the output signal 29 (see FIG. 3(e)). The pseudo vertical sync signal insertion circuit 11 adds the signal 29 to the video signal 27, and outputs a resulting signal as the video signal 32.

Similar processing is subsequently carried out for the heads 3a, 2a and 3a, as shown in FIG. 3.

Usually, in a tape recorded with NTSC interlaced scanning, although H-alignment is attained, there is a H-sync positional deviation of 1.5H in the SP mode and 0.5H in the EP mode at the lower end of the tape. Therefore, the H-sync positional deviation between adjacent tracks at the lower end of the tape is NH (N takes such values as 0.25, 0.5, 0.75 and 1.5; NH=N×63.5 µs). Even if the V-sync frequency becomes indeterminate when the same track is reproduced L times (L is an odd number not less than three; three times in this embodiment), no vertical wobbles occur because a monitor establishes vertical synchronization by using the pseudo vertical sync signal that is output from the pseudo vertical sync signal generation circuit 13 in accordance with a reproduction locus of each head. Furthermore, as for the time deviation between image signals corresponding to the head gap space MH (M is an integer; 2H in this embodiment), the delay time is made variable (adjustable) such that the variable delay circuit 12 reads a DC level set by the variable volume 12a centered at a µs (2H or, for example, 50 µs). Hence, it is possible to completely eliminate vertical wobbles by adding the pseudo vertical sync signal to the reproduction video signal.

Second Embodiment

In the first embodiment, the delay of reproduction video signals associated with the first heads 2a and 2b are made variable by using the switch 14 and the variable delay circuit 12 with the center of a variable range set at a µs. Conversely, in the second embodiment, reproduction is performed by the heads 2b, 3b, 2b, 2a, 3a, and 2a in this order, and the delay time of signals reproduced by the second heads 3a and 3b is made variable by using the variable delay circuit 12.

In the first embodiment, the center line of a recording track is traced and reproduced by the first heads 2a or 2b, the delay time of a µs is set in the variable delay circuit 12, and the switch 14 selects the delayed pseudo vertical sync signal. In the second embodiment, the center line of a recording track is traced by the second heads 3a or 3b.

Figure 4:
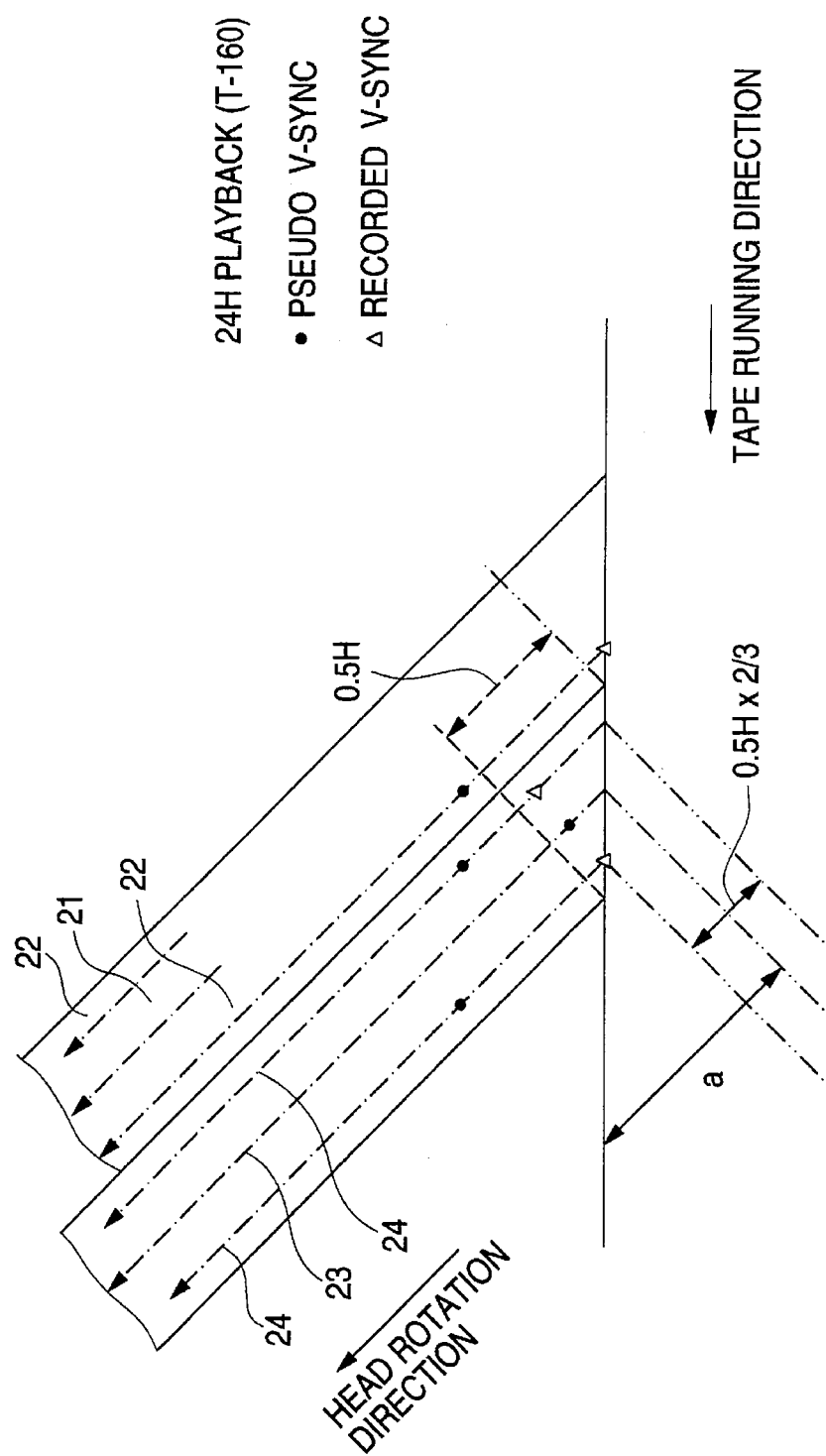
FIG. 4 illustrates how recording tracks are traced by respective heads in the invention.
Figure 5:
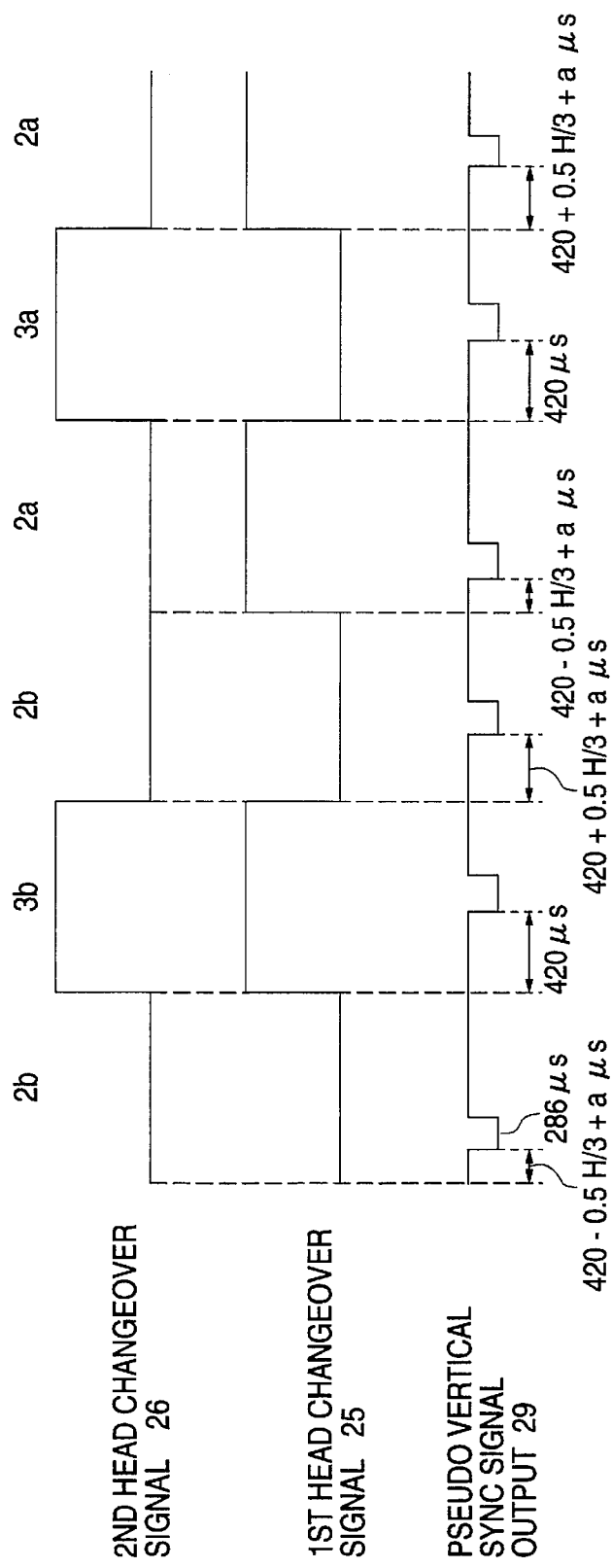
FIG. 5 is a timing chart showing a relationship between a pseudo vertical sync signal and the first and second head changeover signals.

An explanation will now be given of a case where long-term (24 hours) recording is carried out by using a T-160-minute tape with the center lines of recording tracks traced by the second heads 3a and 3b. FIG. 4 shows scanning loci of the heads on video tracks, and FIG. 5 shows a relationship between the pseudo vertical sync signal and the first and second head changeover signals.

The output waveforms shown in FIG. 5 will now be described. As shown in FIG. 5, when first reproduction is performed by the head 2b, a pseudo vertical sync signal 29 with a delay of 420+a µs is output. That is, in this case, since the second head changeover signal 26 at an L level is input to the switch 14, the pseudo vertical sync signal 30 is selected from the two signals being input to the switch 14, and supplied to the pseudo vertical sync signal insertion circuit 11 as the output signal 29.

When reproduction is performed by the head 3b, a pseudo vertical sync signal 30 with a delay by 420 µs produced by the pseudo vertical sync signal generation circuit 13 is input to the switch 14 and the variable delay circuit 12. At this time, since the second head changeover signal 26 at an H level is input to the switch 14, the pseudo vertical sync signal 30 is selected from the two signals being input to the switch 14, and supplied to the pseudo vertical sync signal insertion circuit 11 as the output signal 29.

When second reproduction is performed by the head 2b, the second head changeover signal 26 at an L level is input to the switch 14. Therefore, a delayed pseudo vertical sync signal 31 with a delay of 420+a µs is selected by the switch 14, and supplied to the pseudo vertical sync signal insertion circuit 11 as the output signal 29.

Similar processing is subsequently carried out for the heads 2a, 3a, and 2a, as shown in FIG. 5.

Third Embodiment

In the previously mentioned first and second embodiments, the variable delay circuit 12 not only allows the pseudo vertical sync signal to be delayed by a given amount, but also allows the amount of delay to be adjusted. Alternatively, the amount of delay set by the variable delay circuit 12 may be a fixed value.

In this case, the delay is fixed at a µs which corresponds to the gap space (2H) of the magnetic heads, whereby vertical wobbling as would otherwise be caused by the head gap space can be reduced.

Fourth Embodiment

In the above first to third embodiments, the circuit for generating the pseudo vertical sync signal is implemented simply by the pseudo vertical sync signal generation circuit 13, the switching circuit 14, and the variable delay circuit 12, which is implemented by the CR time constant circuit and the counter gate circuit. Alternatively, the utilization of a machine-control microcomputer makes the implementation of the circuit for generating the pseudo vertical sync signal easier.

Figure 6:
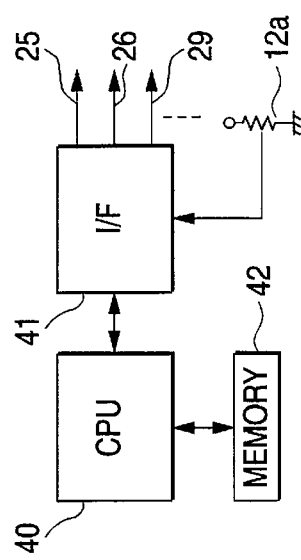
FIG. 6 is a block diagram showing the configuration of a microcomputer used in the invention.

FIG. 6 shows the configuration of such a microcomputer, in which reference numeral 40 denotes a computation means (hereinafter referred to as a CPU), 41 denotes an interface (hereinafter referred to as an I/F), and 42 represents a memory.

Figure 7:
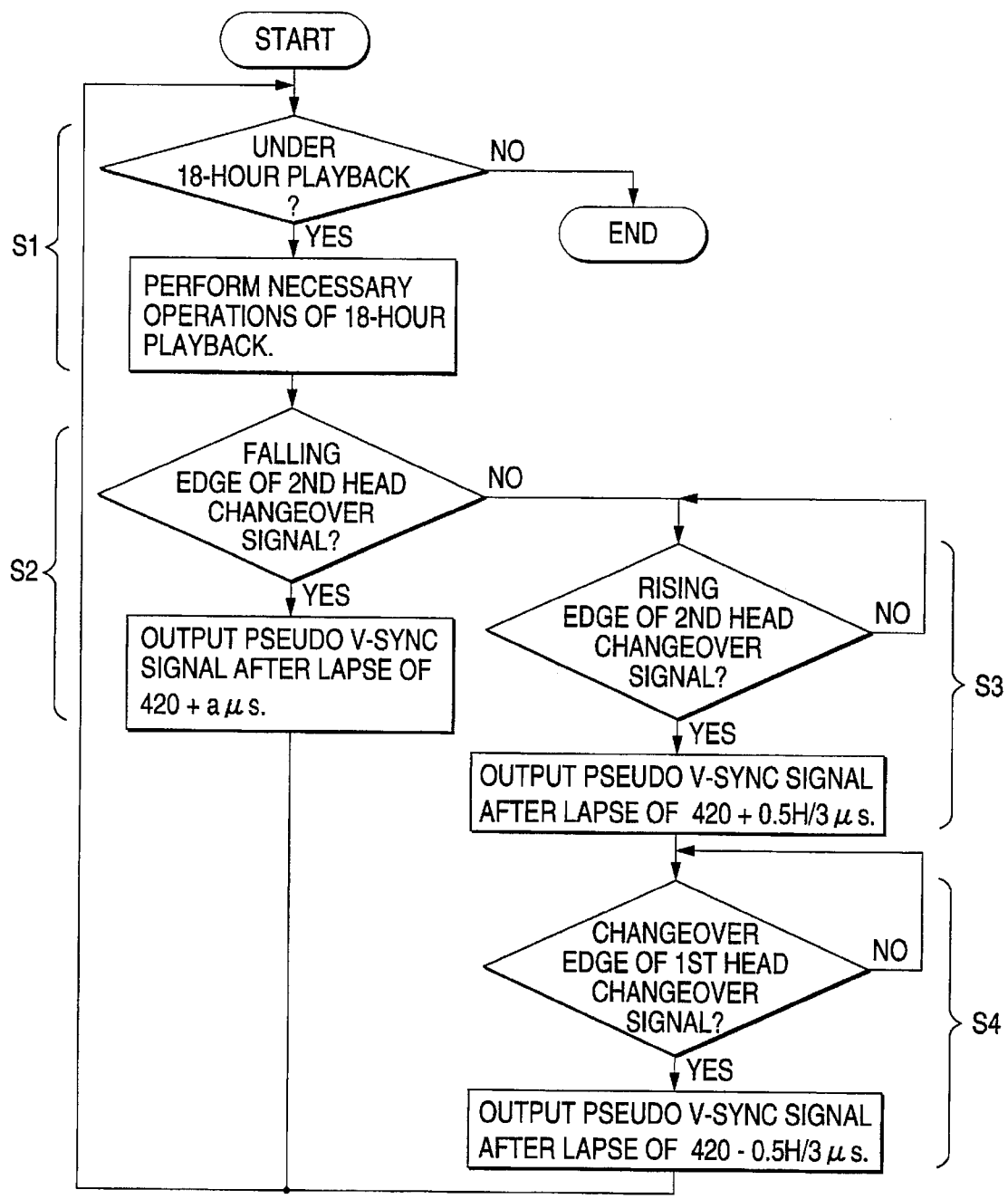
FIG. 7 is a flowchart showing steps to be executed by the microcomputer to produce a pseudo vertical sync signal.

FIG. 7 is a flowchart showing an operation procedure of a 18-hour playback. This flowchart is made up of steps 1 to 4.

The operation of the microcomputer will be described hereunder. The CPU 40 controls the operation of a given time lapse VTR through the I/F 41, and exchanges data with the memory 42. The I/F 41 reads a D.C. voltage of the variable volume 12a through A/D conversion, and produces the first and second head changeover signals 25 and 26 as well as a delay-adjusted pseudo vertical sync signal 29.

The operation procedure of a 18-hour playback will be described with reference to the timing chart of FIG. 3 and the flowchart of FIG. 7. First, in step S1, it is judged whether a 18-hour playback that is set by turning on, for example, a playback key on the front panel of the VTR is started. If the 18-hour playback has been started, predetermined operations such as the rotational driving of the drum 1 of the VTR and the capstan feeding of a recording tape are carried out.

In step S2, a falling edge of the second head changeover signal 26 that is output from the second head changeover signal generation circuit 10 is detected, and, at this time, a pseudo vertical sync signal 29 is output after a lapse of 420+a µs from the edge of the first head changeover signal 25 (see FIG. 3(e)). If no falling edge of the second head changeover signal 26 is detected, the process proceeds to step S3.

In step S3, a leading edge of the second head changeover signal 26 is detected, and, at this time, a pseudo vertical sync signal 29 is output after a lapse of 420+0.5H/3 µs from the edge of the first head changeover signal 25.

In step S4, a changeover edge of the first head changeover signal 25 is detected, and a pseudo vertical sync signal 29 is output after a lapse of 420−0.5H/3 µs from the edge. The process then returns to step S1. These operations are continued until the 18-hour playback is canceled by manipulation of a stop key on the front panel of the VTR.

Fifth Embodiment

The first, third, and fourth embodiments relate to continuous playback in the 18-hour recording mode (where a T-120-minute tape is used), and the second embodiment relates to a continuous playback of the 24-hour recording mode (where a T-160-minute tape is used). The fifth embodiment is directed to a case where a still playback is carried out by temporarily stopping a tape.

A still playback is carried out by using heads of the same azimuth angle while temporarily stopping a tape.

Reference is made to the first embodiment, more specifically, the tracing positions of the heads on the tape. When field signals 21 and 23 are reproduced by the second heads 3a and 3b, the pseudo vertical sync signal generation circuit 13 produces a pseudo vertical sync signal 30 after a lapse of 420 µs in response to a second head changeover signal (H level) 26. The thus-generated pseudo vertical sync signal 30 is supplied, as an output 29, to the pseudo vertical sync signal insertion circuit 11 byway of the switch 14.

When field signals 22 and 24 are reproduced by the second heads 2a and 2b, since a second head changeover signal (L level) 26 is input to the pseudo vertical sync signal generation circuit 13, a delayed pseudo vertical sync signal 31 is supplied, as the output 29, from the switch 14 to the pseudo vertical sync signal insertion circuit 11. In this case, a pseudo vertical sync signal 30 output from the pseudo vertical sync signal generation circuit 13 is delayed by the variable delay circuit 12 by a predetermined time centered at 2H. A delayed pseudo vertical sync signal 31 is output from the variable delay circuit 12 to the switch 14.

It is possible for the user to adjust the delay time with the variable volume 12a on the front panel in accordance with the linearity of the vertical scanning device of each monitor. Still adjustment can be effected so as to prevent wobbles of a still image on the screen.

The variable volume 12a can also be used to make adjustments to vertical wobbling in a continuous playback. In this way, the single variable volume 12a may be used for both of the still adjustment and the prevention of wobbling in a continuous playback. If the amount of shift between the adjustment point of the still adjustment and that for wobbling in a continuous, field-omission playback is set in the memory 42 of the microcomputer shown in FIG. 8, only one adjustment operation suffices for the two cases.

Sixth Embodiment

Figure 8:
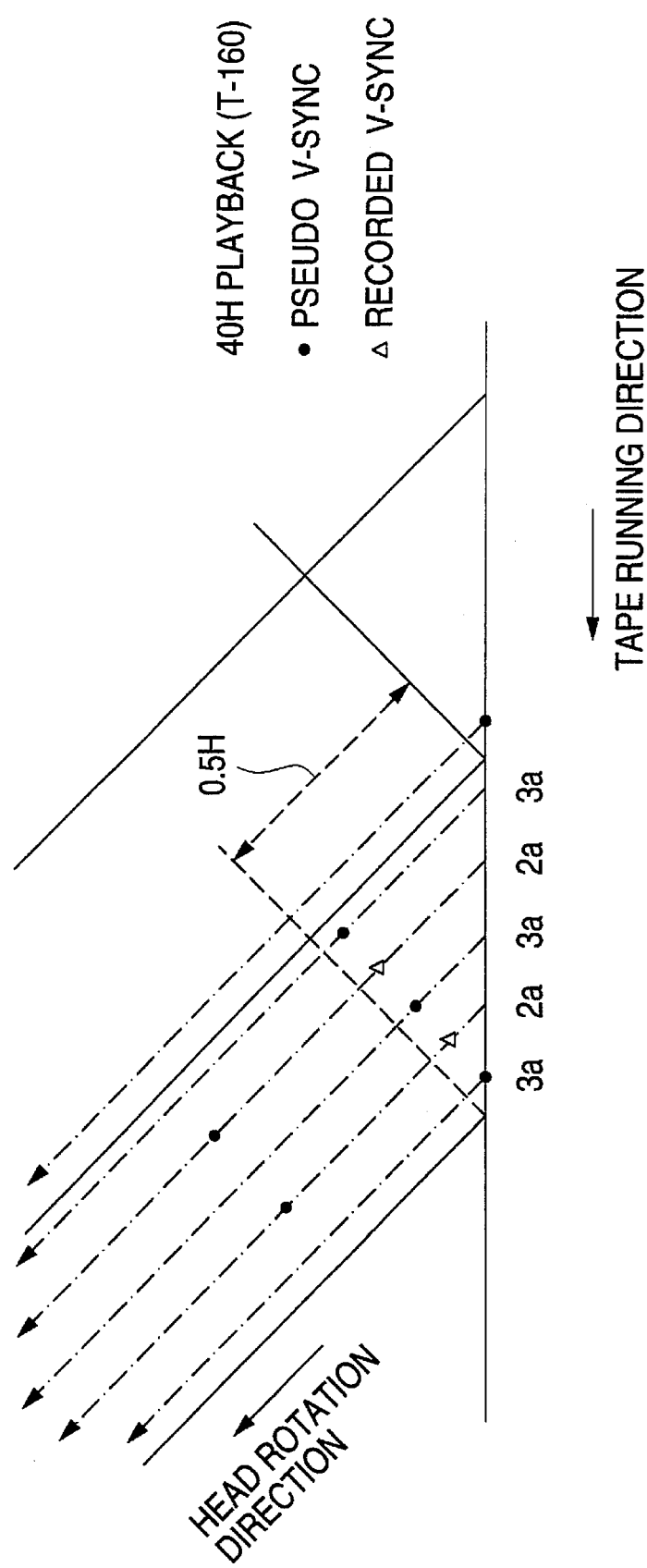
FIG. 8 illustrates how recording tracks are traced by the respective heads in the invention.
Figure 9:
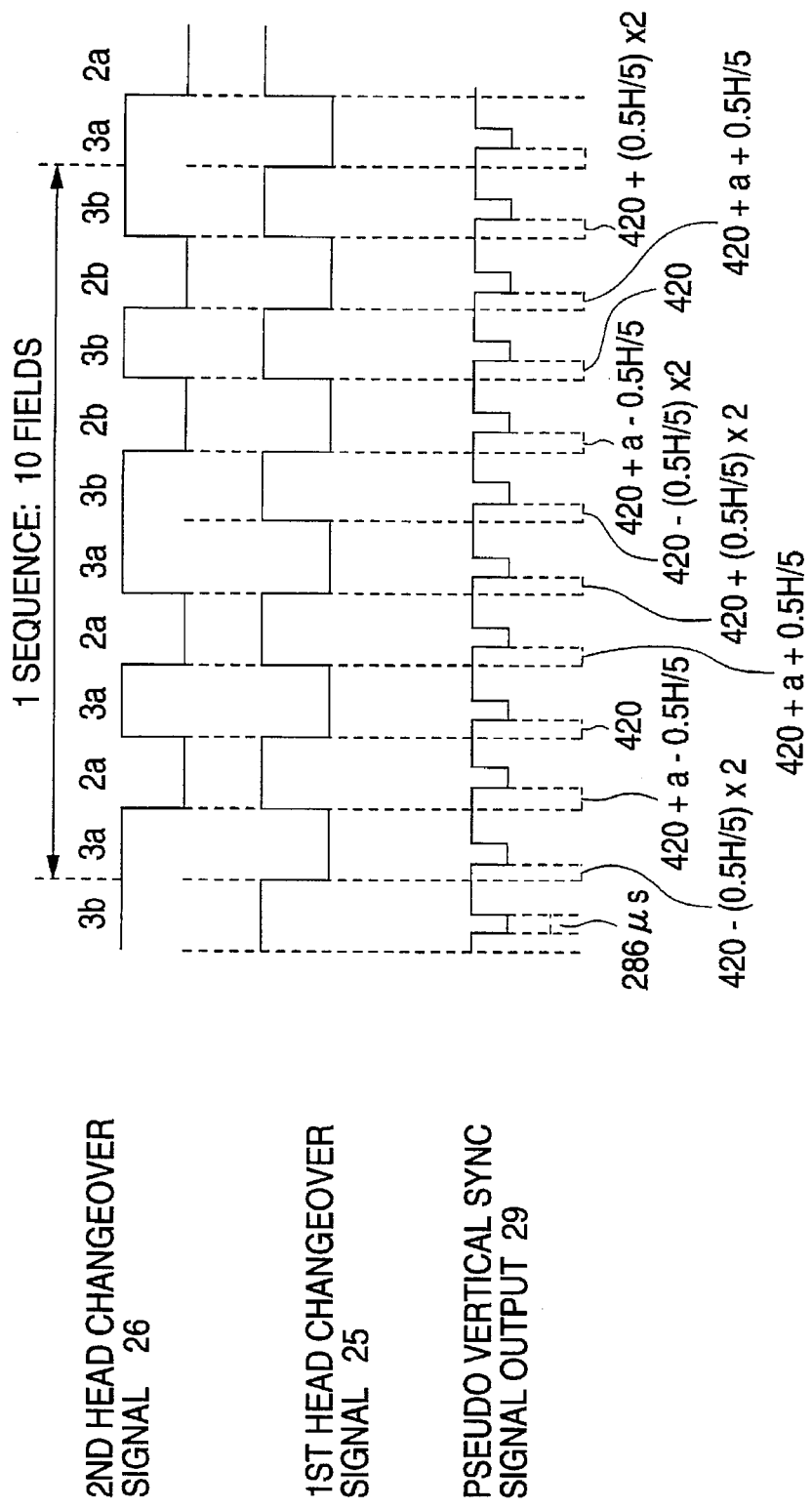
FIG. 9 is a timing chart showing a relationship between the pseudo vertical sync signal and the first and second head changeover signals in the invention.
Figure 10:
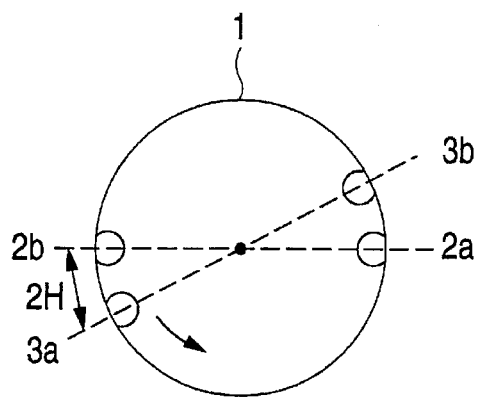
FIG. 10 is a schematic representation showing the arrangement of heads on a rotary drum.

FIG. 8 shows scanning loci of the heads on video tracks in a case where the tape feed rate is reduced to one-fifth of the triple-speed-mode tape feed rate and 40-hour recording is carried out by using a T-160-minute tape. FIG. 9 is a timing chart showing a relationship between a pseudo vertical sync signal 29 and first and second head changeover signals 25 and 26.

In the first to fourth embodiments, recording and playback are carried out by feeding a tape at a rate of one-third of the feed rate of the EP mode. The sixth embodiment is directed to a case where recording and playback are carried out by reducing the tape feed rate to, for instance, one-fifth of the feed rate of the EP mode (three-speed mode).

In this case, FM signals are recorded once every five fields, and hence a one-field FM signal is eventually recorded at a rate of one field per five fields in a recording track width of the EP mode.

The operation of this embodiment will be described below. FIG. 8 shows scanning loci obtained when the second head 3a traces the center of the recording track. As shown in the drawing, one recording track is traced five times by the heads 3a, 2a, 3a, 2a and 3a in this order. At this time, a pseudo vertical sync signal 29 is generated at the timing shown in FIG. 9. At first reproduction of a video signal by use of the head 3a, the pseudo vertical sync signal generation circuit 13 outputs a pseudo vertical sync signal 30 delayed by 420−(0.5H/5)×2 µs, which is input to the switch 14.

At this time, since the switch 14 is receiving a H-level second head changeover signal 26, the pseudo vertical sync signal 30 is selected from the two signals being input to the switch 14. Thus, the signal delayed by 430−(0.5H/5)×2 µs is supplied, as an output 29, to the pseudo vertical sync signal insertion circuit 11.

When a video signal is subsequently reproduced by the head 2a, a pseudo vertical sync signal 30 delayed by 420−(0.5H/5)×2 µs is supplied from the pseudo vertical sync signal generation circuit 13 to both of the switch 14 and the variable delay circuit 12. At this time, since the switch 14 receives a L-level second head changeover signal 26, the delayed pseudo vertical sync signal 31 is selected from the two signals being input to the switch 14. Thus, a signal delayed by 420+a−(0.5H/5)×2 µs becomes the output 29.

At second reproduction of a video signal by use of the head 3a, a pseudo vertical sync signal 30 delayed by 420 µs is supplied from the pseudo vertical sync signal generation circuit 13 to both of the switch 14 and the variable delay circuit 12. At this time, since the switch 14 receives a H-level second head changeover signal 26, the delayed pseudo vertical sync signal 31 is selected from the two signals being input to the switch 14. Thus, a signal delayed by 420 µs becomes the output 29.

At second reproduction of an video signal by use of the head 2a, a pseudo vertical sync signal 30 delayed by 420+0.5H/5 µs is supplied from the pseudo vertical sync signal generation circuit 13 to both of the switch 14 and the variable delay circuit 12. At this time, since the switch 14 receives a L-level second head changeover signal 26, the delayed pseudo vertical sync signal 31 is selected from the two signals being input to the switch 14. Thus, a signal delayed by 420+a+0.5H/5 µs becomes the output 29.

At third-reproduction of a video signal by use of the head 3a, a pseudo vertical sync signal 30 delayed by 420+(0.5H/5)×2 µs is supplied from the pseudo vertical sync signal generation circuit 13 to both of the switch 14 and the variable delay circuit 12. At this time, since the switch 14 receives a H-level second head changeover signal 26, the pseudo vertical sync signal 30 is selected from the two signals being input to the switch 14, to become as the output 29.

Further, as shown in FIG. 9, the pseudo vertical sync signal 29 is output as reproduction is carried out by using the heads 3b, 2b, 3b, 2b and 3b in this order.

Although the embodiments are directed to the cases where the tape feed rate is one-third and one-fifth of that of the EP mode, it is possible to carry out a playback at 1/L of the tape feed rate of the EP mode (L is an odd number not less then 3 as previously described in the first embodiment).

When a tape is fed at one-fifth of the tape feed rate of the EP mode, it is possible to effect 30-hour recording with a 120-minute tape and 40-hour recording with a 160-minute tape.

Although in the embodiments the tape feed rate is set with the tape feed rate of the triple-speed mode (EP mode) used as the reference, the tape feed rate may be set at one-third, one-fifth, . . . , 1/L of that of the double-speed mode (LP mode). Further, the tape feed rate may be set at one-third, one-fifth, . . . , 1/L of the standard tape feed rate.

Where the tape feed rate is set at 1/L, the interval of generation of pseudo vertical sync signals becomes NH/L because the deviation between adjacent tracks is NH. Therefore, when the deviation between adjacent tracks is 0.5H, pseudo vertical sync signals are produced at intervals of 0.5H/L.

What is claimed is:

1. An image reproducing apparatus comprising:
   a pair of first heads opposed to each other on a head drum;
   a pair of second heads opposed to each other on the head drum, and spaced from the respective first heads by a distance corresponding to a horizontal scanning period multiplied by a given integer;
   first head changeover signal generating means for generating a first head changeover signal to be used for switching between the first heads and between the second heads;
   second head changeover signal generating means for generating a second head changeover signal to be used for switching between the pair of first heads and the pair of second heads;
   reproduction signal processing means for selecting one of FM signals reproduced by the first and second heads in accordance with the first and second head changeover signals, and for converting the selected FM signal into a video signal;
   pseudo vertical sync signal generating means for generating a pseudo vertical sync signal in accordance with the first and second head changeover signals;
   pseudo vertical sync signal adding means for adding the pseudo vertical sync signal to the video signal produced by the reproduction signal processing means;
   recording medium feeding means for feeding a recording medium so that a FM signal recorded on a portion of the recording medium corresponding to a width of a recording track of a normal-speed recording, double-speed recording, or triple-speed recording is reproduced by the first and second heads by at least one field for each head; and
   delay means for changing timing of the pseudo vertical sync signal with respect to the first head changeover signal in accordance with the second head changeover signal.

2. The image reproducing apparatus as defined in claim 1, wherein the delay means switches between first timing of the pseudo vertical sync signal for the video signal produced by use of the first heads and second timing of the pseudo vertical sync signal for the video signal produced by use of the second heads.

3. The image reproducing apparatus as defined in claim 2, wherein a difference between the first timing and the second timing is set in the delay means at a time necessary for the head drum to rotate over the distance between the first heads and the second heads.

4. The image reproducing apparatus as defined in claim 1, wherein the first and second head changeover signal generating means generate the first and second head changeover signals to be used for switching between the first and second heads so that the first or second heads reproduce FM signals that are recorded so that horizontal sync signals of adjacent recording tracks are deviated from each other by NH at a bottom end of the recording medium, where H is the horizontal scanning period;
   the recording medium feeding means feeds the recording medium at so low a speed that the portion of the recording medium corresponding to the width of the recording track of the normal-speed recording, the double-speed recording, or the triple-speed recording is reproduced by at least one field by each head and is reproduced by L fields by the first head and the second head; and
   the pseudo vertical signal generating means generates pseudo vertical signals that are deviated from each other at intervals of NH/L.

5. The image reproducing apparatus as defined in claim 2, further comprising adjusting means for changing the difference between the first timing and the second timing.

6. The image reproducing apparatus as defined in claim 2, wherein the recording medium feeding means feeds and stops the recording medium so that a FM signal recorded on the same recording track is reproduced by the first head and the second head by at least one field; and wherein the delay means changes timing at which the pseudo vertical sync signal is added to a video signal being reproduced while the recording medium is stopped by the recording medium feeding means, the image reproducing apparatus further comprising adjusting means for adjusting the difference between the first timing and the second timing.

7. The image reproducing apparatus as defined in claim 5, wherein the adjusting means can adjust the difference while FM signals are reproduced from the recording medium while the recording medium is fed, as well as while it is stopped.

8. The image reproducing apparatus as defined in claim 6, wherein the adjusting means can adjust the difference while FM signals are reproduced from the recording medium while the recording medium is fed, as well as while it is stopped.

* * * * *